United States Patent
Luther et al.

(10) Patent No.: US 7,036,464 B2
(45) Date of Patent: May 2, 2006

(54) METHOD FOR LUBRICATING AT LEAST TWO UNITS OF A VEHICLE EQUIPPED WITH AN INTERNAL COMBUSTION ENGINE

(75) Inventors: Rolf Luther, Speyer (DE); Christian Seyfert, Mannheim (DE)

(73) Assignee: Fuchs Petrolub AG, Mannheim (DE)

( * ) Notice: Subject to any disclaimer, the term of this patent is extended or adjusted under 35 U.S.C. 154(b) by 0 days.

(21) Appl. No.: 10/492,133

(22) PCT Filed: Oct. 11, 2002

(86) PCT No.: PCT/EP02/11385

§ 371 (c)(1),
(2), (4) Date: Apr. 7, 2004

(87) PCT Pub. No.: WO03/033957

PCT Pub. Date: Apr. 24, 2003

(65) Prior Publication Data

US 2004/0211386 A1    Oct. 28, 2004

(30) Foreign Application Priority Data

Oct. 11, 2001    (DE) ............................... 101 49 992

(51) Int. Cl.
*F16N 7/38* (2006.01)
(52) U.S. Cl. ...................... 123/2; 123/196 R; 123/1 A; 60/303; 60/396; 303/5
(58) Field of Classification Search ............ 123/196 R, 123/1 A, 2, 73 AD; 60/303
See application file for complete search history.

(56) References Cited

U.S. PATENT DOCUMENTS

| 4,417,561 | A | | 11/1983 | Yasuhara |
| 5,353,760 | A | | 10/1994 | Zager |
| 5,509,381 | A | * | 4/1996 | Fisher ..................... 123/196 R |
| 5,970,942 | A | * | 10/1999 | Koeberlein et al. ..... 123/196 R |
| 6,382,170 | B1 | | 5/2002 | Mang et al. |
| 6,532,918 | B1 | | 3/2003 | Mang et al. |

FOREIGN PATENT DOCUMENTS

| DE | 30 19 877 A1 | 11/1980 |
| DE | 30 06 903 A1 | 9/1981 |
| DE | 31 38 144 A1 | 4/1982 |
| DE | 41 40 667 A1 | 6/1993 |
| DE | 197 47 854 A1 | 5/1999 |
| GB | 2 084 667 A | 4/1982 |
| WO | WO 99/23365 A1 | 5/1999 |

* cited by examiner

*Primary Examiner*—Andrew M. Dolinar
(74) *Attorney, Agent, or Firm*—Foley & Lardner LLP

(57) ABSTRACT

The present invention relates to a method for lubricating at least two units of a vehicle having an internal combustion engine, each unit comprising one or more assemblies, and to a corresponding vehicle. In order to be able to dispense with an oil change of the individual units, and at the same time ensure the necessary quality and quantity of lubricant, it is proposed according to the invention to conduct the lubricant in series through the at least two units in that fresh lubricant is fed to the first unit from a container, at least some of the used lubricant is removed from the oil trough of the individual units and is fed to the unit which is respectively arranged afterwards in the series, and the lubricant which is removed from the oil trough of the last unit is fed to the internal combustion engine for combustion.

20 Claims, 1 Drawing Sheet

Figure 1:
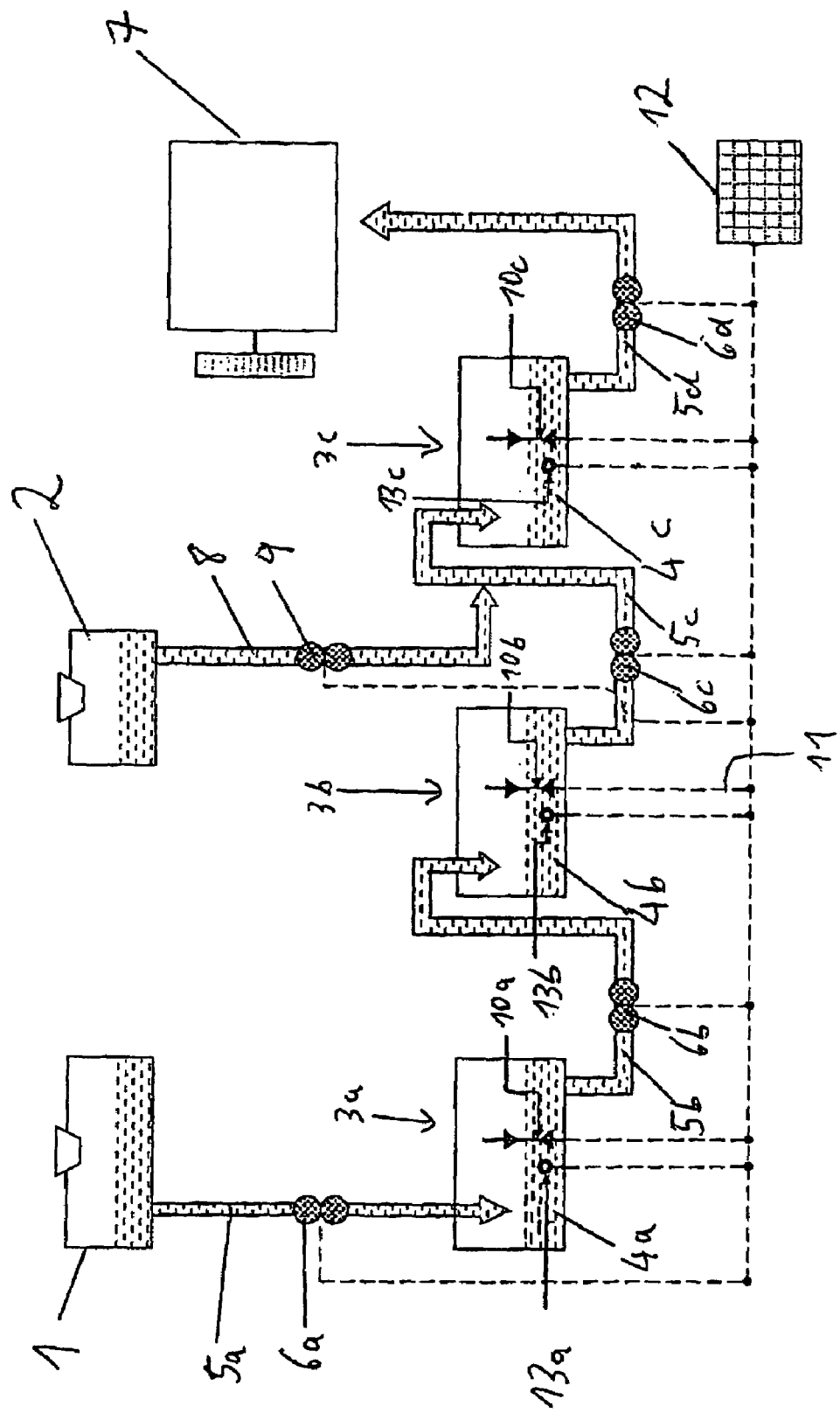

METHOD FOR LUBRICATING AT LEAST TWO UNITS OF A VEHICLE EQUIPPED WITH AN INTERNAL COMBUSTION ENGINE

The present invention relates to a method for lubricating at least two units of a vehicle having an internal combustion engine, each unit comprising one or more assemblies, and to a corresponding vehicle.

In conventional vehicles with an internal combustion engine, the individual assemblies such as the transmission, engine, hydraulics, wet brakes, retarders and the like are lubricated in closed lubricant circuits which are separated from one another. In order to ensure optimum lubrication of the lubrication points of the individual assemblies, different lubricants based on mineral oils or partially or completely synthetic fluids, which are adapted to the respective technical lubrication requirements of the individual assemblies by adding special additives, are generally used for the various lubrication circuits.

In order to reduce the number of different lubricants which are necessary as a result of this, recently universal lubricants which are mainly suitable for agricultural and forestry vehicles, for example UTTO (Universal Tractor Transmission Oil) and STOU (Super Tractor Oil Universal), which can be used for lubricating a plurality of assemblies, have been developed. Whereas UTTO products can be used for lubricating hydraulics, transmission and wet brakes, STOU oils are also suitable for lubricating engines. By using such universal lubricants it is possible to supply a plurality of assemblies, such as hydraulics, transmission and wet brakes, with a lubricant from a common lubricant circuit, which lubricant is however structurally separated from the lubricant circuit of the internal combustion engine owing to the different requirements made in terms of the purity of the lubricant. Accordingly, such vehicles have two separate units which are supplied by one isolated lubricant circuit in each case, specifically on the one hand a unit which is composed of the assemblies comprising the hydraulics, transmission and wet brakes, and on the other hand the internal combustion engine.

All these systems have in common the fact that an oil change has to be carried out at the individual lubricant circuits at chronological intervals because, during the consumption, active ingredients are used, and the lubricant ages and is contaminated with extraneous substances. However, during an oil change, dangerous quantities of waste oil are produced which have to be disposed of at some cost in accordance with their waste rating. In addition, each oil change inevitably requires the vehicle to be stationary for a time and incurs maintenance costs. In addition, in vehicles with a plurality of lubricant circuits, different oil change intervals are often necessary and it is necessary to fill the circuits with different lubricants, making the logistics of an oil change more difficult.

In order to be able to dispense with at least one oil change of the engine lubricant circuit, it has recently been proposed to burn used lubricant continuously or at intervals together with the fuel in the engine. With this type of waste lubrication, use is made of the fact that up to several percentages of oil can be added to the fuel of the internal combustion engine without adversely affecting the performance of the engine, said oil then being burnt along with the combustion of fuel.

DE 31 38 144 A 1 discloses a lubricant and fuel circuit, in particular for the diesel engines of heavy goods vehicles, in which a given quantity of lubrication oil is periodically extracted from the oil trough of the engine and fed to the fuel tank in order to burn the extracted quantity together with the customary diesel fuel in the engine. Furthermore, an automatically operating arrangement for monitoring the lubricant level is provided in order to keep it at a set point level in the oil trough so that freshly lubricant oil is continuously fed into the lubricant circuit and at the same time the waste oil is periodically cleaned. Only one engine oil change which generally takes place at intervals is therefore avoided by virtue of the fact that a specific quantity of used engine oil is continuously replaced by a corresponding quantity of fresh engine oil, and the used engine oil is burnt with the fuel.

DE 30 19 877 A1 discloses a device for changing oil in an internal combustion engine with a lubrication system and an oil trough and a fuel system with a fuel tank in which, in order to change the oil automatically and conduct away used lubricant, oil feeding means for transferring some of the used engine oil from the lubrication system to the fuel system are provided in order to mix the used proportion of oil with fuel. Furthermore, the device has an oil tank for storing fresh oil as well as an oil supply means for supplying fresh oil from the oil tank to the lubrication system.

DE 30 06 903 A1 discloses a method for replacing the lubrication oil collected in the oil sump of an internal combustion engine, using an oil discharge pump which has to be controlled separately, in which method the oil discharge pump adds metered quantities of oil from the oil sump of the internal combustion engine to the fuel of the internal combustion engine and at least the quantity of fresh oil which corresponds to the discharged quantity of oil is fed to the internal combustion engine. Here, the quantities of oil are dimensioned in such a way that the prescribed oil filling quantity is discharged independently of the oil consumption of the internal combustion engine within an oil change interval. The control device is configured in such a way that the oil discharge pump begins to operate only during a fuel filling process during which the filling level measuring display moves upward within a short time.

Finally, WO 99/23365 discloses a method for lubricating and simultaneously supplying fuel to the internal combustion engine in which a plant oil which has been treated with additives is continuously fed as lubricant to the internal combustion engine during operation, and the used plant oil lubricant is metered, together with a mixture of fresh plant oil and diesel oil or rape seed oil methyl ester in the engine, and burnt as engine fuel.

Although these methods make it possible to dispense with an oil change of the engine lubrication circuit, the lubricants for the other assemblies such as the transmission, hydraulics and the like have to be replaced at regular intervals with the associated disadvantages. A further disadvantage of these methods is the logistical expenditure on supplying fresh lubricant to the individual lubrication circuits which are separated from one another.

The object of the present invention is therefore to make available a method for lubricating all the fluid-lubricated units, however at least two units of a vehicle having an internal combustion engine, in which an oil change is not necessary for the respective units, and nevertheless the necessary quality and quantity of lubricant is ensured.

This object is essentially achieved with a method of the type mentioned at the beginning in that the lubricant is successively conveyed through at least two units, in that fresh lubricant is fed to the first unit from a container, at least some of the used lubricant is removed from the oil trough of the individual units and fed to the unit which is respectively arranged afterwards in the series, and the lubricant which is removed from the oil trough of the last unit is fed to the internal combustion engine for combustion.

Owing to the common lubrication of all the units with a lubricant and subsequent thermal recycling of the waste oil in the engine, with the method according to the invention an oil change is no longer necessary in the respective units so that costly disposal of waste oil is dispensed with, and the stationary times of the vehicle which result from this are avoided. In addition, all that is now necessary is to feed fresh oil to the first unit in the series so that the logistical expenditure is considerably reduced. Apart from the maintenance advantages and the simplified logistics for the operator, this method ensures that, on the one hand, during operation, fresh, or at most lightly aged lubricant which is still suitable for lubrication, is fed continuously to all the units, and, on the other hand, aged lubricant is continuously removed from these lubrication circuits so that a lubricant which is sufficiently fresh is always available in all the lubrication circuits for optimum lubrication of the lubrication points. Here, the refreshing rate, that is to say the proportion of the fresh lubricant which is fed to the units and of the used lubricant which is removed from the lubrication circuits, with respect to the fuel consumption, can be adapted to the quality of the used lubricant and to the loading to which the lubricant is subjected overall in all the units.

The refreshing rate is preferably between 0.1% and 2.5%.

Furthermore, the units are preferably arranged in accordance with the degree of their requirement for purity of the lubricant. This ensures that the unit with the highest requirement of purity is fed with fresh lubricant while the lubricant supply of the units with lower requirements is refreshed with partially aged lubricant from the unit which was respectively arranged in the preceding position in the series before the used lubricant is then burnt in the internal combustion engine at the end of the use chain.

In a tractor with two separate lubrication circuits, specifically one for hydraulics, transmission and wet brakes and one for the engine, for example fresh lubricant is preferably firstly fed to the unit composed of hydraulics, transmission and wet brakes, since in said unit the purity of the lubricant, a constant coefficient of friction of the wet brake and good wear protection properties are decisive for optimum lubrication. On the other hand, the thermal loading of the lubricant in comparison to the engine is not very high so that no appreciable aging of the lubricant occurs before the oil is removed from this lubrication circuit and used for lubricating the engine. In the engine, the lubricant is then very heavily loaded in terms of thermal oxidation, and a high degree of charging with pollutants, in particular soot, occurs.

According to one preferred embodiment of the present invention there is provision that additives are added to the lubricant removed from a unit before said lubricant is supplied to the unit which follows in series. Such adding of additives is expedient especially after the lubricant has passed through the unit which is critical in terms of the coefficient of friction and in which the lubricant is particularly stressed, for example in order to supplement additives such as antioxidants, wear protection additives or the like, which have already been decomposed. Although all the units of a vehicle can basically be lubricated with one lubricant, the technical requirements made of these universal oils are very high since the individual units make different requirements of the lubricant. On the one hand, for example the performance level of an HLP hydraulic oil is required for a hydraulic oil, and on the other hand, the vehicle transmission is to be supplied with a lubricant according to GL-4 or the like. In addition to these requirements for aging stability, wear protection, viscosity temperature behavior, air release capability and corrosion protection, wet braking and synchronizations as well as automatic transmissions additionally produce very specific requirements in terms of the coefficients of friction. As a result of the inventive addition of additives, the lubricant which is conveyed through all the units can be optimized to the requirements of the next unit. For example, dispersants and detergents are essential to keep the internal combustion engine clean, but on the other hand are not necessary in the transmission circuit and hydraulic circuit. For example, it is conceivable to optimize an UTTO oil after use in the engine lubrication circuit after use in the common transmission and hydraulic sump of a tractor by adding dispersants, detergents and further additives, in particular additives for protecting the engine against charging with acid combustion gases, and for protecting against the formation of surface coatings, mud and deposits.

The additives are preferably added directly into the oil trough of the unit or into the oil line leading to the unit, by means of an automatic device, metering pump or the like.

In order to avoid increased emissions after the lubricant has been burnt in the engine, lubricants which are suitable for also being burnt in the engine and which are, if appropriate, treated with additives, in particular ash-free and heavy-metal-free, low-sulfur and low-phosphorus formulations are used for lubricating the assemblies. For this purpose, in particular lubricants based on plant oils have proven suitable, it being possible to compensate for the aging stability of these plant lubricants, which is lower in comparison with mineral oils, by increasing the refreshing rate.

In order to remove the used lubricant from the last unit in the series, it is possible to burn it in the engine together with the fuel. This has the advantage that the lubricant is also used as a fuel. In order to mix the burnt lubricant with the fuel, the lubricant can be fed, for example, to the fuel line, specifically preferably before the fuel filter, in order to retain any pollutant in the used lubricant.

Alternatively to this, small quantities of waste oil can also be disposed of by means of direct injection into the hot exhaust section of the internal combustion engine. Here, at temperatures of more than 500° C., auto-ignition occurs so that the waste oil burns with the impurities contained in it without possibly disruptive additives, particles or the like being able to cause problems in the engine.

The burning of waste oil preferably takes place in proportion to the fuel consumption in order to keep the vehicle emissions at a constant rate. Alternatively, it is possible to provide for the waste oil also to be burnt only in specific engine states, for example only when there is a full load or partial load of more than 70%, or to regulate the refreshing rate of the lubricant in all the units as a function of the signal of an oil state sensor. For example, the viscosity can serve as a criterion for the oil state for a vehicle which is lubricated with a lubricant which is based on rape seed oil. In this variant, the refreshing method is then activated when a specific limiting value of the viscosity is exceeded, by removing some of the used oil from the respective unit and replacing it with fresher oil. For other lubricants it is also possible to use one or more other lubricant parameters to regulate the refreshing rate.

In a development of the inventive idea it is proposed-always to maintain an essentially constant quantity of lubricant in all the units involved, for example by monitoring the supply of fresh oil and discharge of waste oil, in order to ensure that there is uniform and reliable lubrication.

The lubricant is preferably fed through the series composed of a reservoir container for fresh lubricant, first to last unit to be lubricated and a fuel line or exhaust section of the engine, by means of electric, mechanical or hydraulic metering pumps, self-venting pumps being particularly preferably used. According to the invention, the pumps can both be activated and regulated individually and operated in a mechanically or electronically coupled fashion. It is also possible to use electric or mechanically or hydraulically activated valves to control the flow of oil for the refreshing process.

According to a further embodiment of the present invention, a filling level measuring device is assigned to all the units, or to a selection of units, which filling level measuring device can be used to control the corresponding metering pumps and/or valves in such a way that the volume of oil or the oil level in the units is prevented from dropping or being exceeded. A central control device preferably regulates all the pumps, valves etc. and for this purpose evaluates all the signals of the filling level measuring device and, if appropriate, further sensors. According to the invention, it is also possible to integrate all the metering pumps, valves and the regulating electronics which are necessary for the described method into the on-board electronics of the vehicle, said integration permitting, for example when vehicles are first equipped, an integrated design of the lubrication system. Lubricant, i.e. the mixture of fresh oil and waste oil which occurs in the units, can be continuously discharged from all the units, this mixture preferably being discharged at the point where the contamination of the oil is highest. In this way, the highest possible degree of purity of the oil is always achieved in the respective unit.

The method according to the invention is suitable in principle for all types of vehicles, in particular for land vehicles and watercraft. Tractors, which have, as units to be lubricated, on the one hand an engine and, on the other hand, a unit composed of the assemblies comprising the hydraulics, transmission and wet brakes, construction machinery having the units comprising an engine, transmission and hydraulics, buses and trucks having the units comprising an engine, transmission and retarder, passenger cars, ships and boats having a separate transmission circuit and engine oil circuit as well as fixed engines with a common coolant circuit and engine oil circuit are cited by way of example as application examples, in a non-restrictive fashion.

One particular advantage of the method according to the invention is that the structural measures which are necessary for it can be taken into account not only when new vehicles are manufactured but can also be correspondingly retrofitted in used vehicles.

A further object of the present invention is a vehicle which is suitable in particular for carrying out the method described above and which has an internal combustion engine.

According to the invention, the vehicle with internal combustion engine has a reservoir container for fresh lubricant, at least two units to be lubricated, each unit comprising one or more assemblies and having an oil trough, a fuel tank and a fuel line for feeding fuel into the internal combustion engine, at least two of the units being arranged in a series in such a way that a feed line for fresh lubricant leads from the reservoir container to the first assembly in the series, a lubricant line leads in each case from the unit arranged in the preceding position in the series to the unit arranged afterwards in the series, and a discharge line for used lubricant leads into the fuel line or the exhaust section of the internal combustion engine from the last unit in the series.

According to one particular embodiment of the present invention, the vehicle additionally has at least one additive tank from which an additive line leads into a lubricant line which leads to at least one unit, or alternatively leads directly into the oil trough of a unit. By means of the metered addition of additives, the lubricant which is conveyed through all the units can be optimized to the requirements of the corresponding units.

In one development of the inventive idea, it is also proposed to equip at least one of the lubricant lines with a metering pump via which the lubricant is fed through the corresponding lubricant line.

In addition, at least one of the units can have an automatic filling level measuring device which, if appropriate via a control device, to the metering pump or pumps, and thus permits the refreshing rate to be controlled and the lubricant filling level in the individual units to be controlled.

In addition or alternatively to the at least one automatic filling level measurement device it is possible to provide, also for controlling the refreshing rate, an oil state sensor which is connected, if appropriate via a control device, to the metering pump or pumps and thus permits the refreshing rate to be controlled as a function of the lubricant quality.

According to one particular embodiment of the present invention, the vehicle has a central control device which evaluates the measured values of the or of the filling level measuring device and/or oil state sensors and converts them into a control signal by means of which the metering pump or metering pumps are controlled. Moreover, the control device can be connected to the on-board electronics or other vehicle components in such a way in order to call additional information there, for example load, engine speed, oil temperatures, current fuel consumption, and to use this information to control the metering pump or metering pumps.

Further objectives, features, advantages and application possibilities of the invention emerge from the following description of exemplary embodiments with reference to the drawing. Here, all the features described and/or illustrated graphically form, in themselves or in any desired combination, the subject-matter of the invention, even independently of their combination in individual claims or their back reference.

The single figure is an exemplary schematic view of a vehicle for carrying out the method.

The vehicle has a reservoir container 1 for fresh lubricant, an additive tank 2 and three units 3a, 3b and 3c to be lubricated, the unit 3a which is arranged first in the series being, for example, the hydraulics, the second unit 3b being the transmission and the third unit being the engine 3c. All three units 3a, 3b and 3c are lubricated by circulation lubrication, the lubricant collecting in the respective oil troughs 4a, 4b, 4c after it passes through the lubrication points.

A lubrication line 5a which is equipped with a metering pump 6a leads from the reservoir container 1 to the first unit 3a in the series, through which line fresh lubricant can be continuously or discontinuously fed to said first unit 3a. In addition, the first unit 4a is connected to the second unit 4b, and the second unit 4b is connected to the third unit 4c, in each case via a lubricant line 5b, 5c which is equipped with a metering pump 6b, 6c and through which lubricant can be fed from the respectively preceding unit 4a, 4b to the respectively following unit 4b, 4c. Finally, the lubricant discharge line 5d which is equipped with a metering pump 6d leads from the third unit 4c either into the exhaust section of the engine 7 or into the fuel line (not illustrated in the drawing) in order to burn the extracted, used lubricant in the engine. While the lubricant lines 5b, 5c and 5d open, with their removal side, into the bottom of the respective oil troughs 4a, 4b and 4c so that as far as possible selectively used lubricant is extracted from the units 3a, 3b and 3c, the supply sides of the lubricant lines 5a, 5b and 5c each open into a region which is spatially separate there from, for example at a point which is arranged above the lubrication points, in order to prevent as far as possible fresh lubricant, or lubricant which has been subjected to little aging, being removed from the units 3a, 3b and 3c through the lubricant lines 5b, 5c and 5d. Furthermore, an additive line 8 which leads from the additive tank 2 to the lubricant line 5c which connects the second and third units 4b, 4c is provided and it can be used by the metering pump 9 to pump additives into the third unit 3c via the line 5c.

In the oil trough or the oil sump (4a, 4b and 4c) of the units 3a, 3b and 3c, in each case a filling level measuring device 10a, 10b and 10c is provided, which devices are connected via control lines 11 to a central control device 12. The control device 12 receives the filling level signals of all the units via the control lines 11 and can also control the metering pumps 6a, 6b, 6c and the additive pumps 9 via control lines 11 in such a way that the oil level and the additive content in the units always correspond to the necessary level. If, for example, the oil level in unit 3b drops below the defined minimum value, the metering pumps 6a and 6b receive a corresponding control signal for the continued supply of lubricant until the oil level in the unit 4b corresponds to the set point level again. As a result, manual monitoring of the oil level in the individual units becomes superfluous. The oil change of all the individual units which has to be carried out at periodic intervals and which is necessary with conventional lubrication is also eliminated so that only the content of the fresh oil supply container 1 and, if appropriate, of the additive tank 2 has to be regularly replaced. For this purpose, a level monitoring system (not illustrated) can be provided in the two reservoir containers 1 and 2.

In addition to the filling level, the refreshing of the oil in the individual units 3a, 3b and 3c is also regulated by means of the control device 12 in that a quantity of oil which corresponds to the refreshing rate is removed from the unit 3c by means of the metering pump 6d, and the oil level in all the units is adjusted with the metering pumps 6a, 6b and 6c, and the corresponding quantity of additive is fed to the unit 3c via the metering pump 9. In general, small quantities of oil are removed continuously or quasi-continuously from the units 3a, 3b and 3c for refreshing in order to keep the fluctuations in the filling level as small as possible. The refreshing rate can be constant over time here or be regulated as a function of various influencing variables. For example, the quantity of waste oil which is burnt with the fuel can be set in proportion to the fuel consumption in that the current fuel consumption is signaled to the control device 12 by the injection pump or the motor vehicle on-board electronics via a control line (not illustrated). It is also possible to carry out adaptation to the load state of the units in this way. Alternatively or in addition to this, oil state sensors 13a, 13b and 13c may be provided in order to monitor the lubricant state in the units 3a, 3b and 3c. In this way it is possible, when a specific limiting value for the oil state is exceeded, determined for example by means of a parameter such as viscosity, dielectric constant or the like, to selectively replace some of the used oil in all the units 3a, 3b, 3c by means of the metering pumps 6a, 6b, 6c, 6d and 8. Basically, the waste oil which is intended to burn with the fuel should be metered into the fuel by the control device in such a way that the stressing of the environment is minimized. This is preferably carried out in such a way that the used lubricant is continuously metered into the fuel up to a maximum proportion at which permissible emission values are not yet exceeded. A buffer tank may be provided for buffering an excess of used lubricant which occurs under certain circumstances for a brief time.

LIST OF REFERENCE SYMBOLS

1 Reservoir container for fresh lubricant
2 Additive tank
3a–c Unit
4a–c Oil trough
5a–d Lubricant line
6a–d Metering pump of the lubricant line
7 Exhaust section of the engine
8 Additive line
9 Metering pump for adding additives
10a–c Filling level measuring device
11 Control line
12 Control device
13a–c Oil state sensor

The invention claimed is:

1. A method for lubricating at least two units of a vehicle having an internal combustion engine, each unit comprising one or more assemblies, the method comprising:
   successively conveying lubricant through the at least two units including a first unit, in that fresh lubricant is fed to the first unit from a container, at least some of the lubricant, used for lubricating at least one assembly of the first unit, is removed from an oil trough of the first unit and is fed to a consecutive unit which is respectively arranged afterwards in the series, wherein the consecutive comprises at least one assembly being lubricated by the lubricant being conveyed by a previous unit; and
   feeding the lubricant which is removed from the oil trough of a last unit to the internal combustion engine for combustion or feeding or spraying the lubricant into the exhaust section of the engine for combustion of the lubricant,
   wherein the first unit to which the lubricant is fed comprises one or more assemblies selected from the group consisting of hydraulics, transmission, and wet brakes.

2. The method as claimed in claim 1, wherein the refreshing rate of lubricant is 0.1% to 2.5% with respect to the fuel consumption.

3. The method as claimed in claim 1, wherein the units are arranged in accordance with the degree of their requirement for purity of the lubricant.

4. A method for lubricating at least two units of a vehicle having an internal combustion engine, each unit comprising one or more assemblies, the method comprising:
   successively conveying lubricant through the at least two units in that fresh lubricant is fed to a first unit of the at least two units from a container, at least some of the used lubricant is removed from an oil trough of the individual units and is fed to the unit which is respectively arranged afterwards in the series; and
   feeding the lubricant which is removed from the oil trough of the last unit to the internal combustion engine for combustion,
   wherein additives are added to the lubricant removed from the unit, before it is fed to the unit which follows in the series.

5. The method as claimed in claim 4, wherein the additives are input directly into the oil trough of the unit or into the lubricant line which leads to the unit.

6. The method as claimed in claim 1, wherein ash-free and heavy-metal-free, sulfur-free and low-phosphorus formulations on the basis of plant oils are used as lubricants.

7. The method as claimed in claim 1, wherein the lubricant which is removed from the oil trough of the last unit is burnt in the engine, together with fuel supplied from a fuel tank.

8. A method for lubricating at least two units of a vehicle having an internal combustion engine, each unit comprising one or more assemblies, the method comprising:
   successively conveying lubricant through the at least two units in that fresh lubricant is fed to a first unit of the at least two units from a container, at least some of the used lubricant is removed from an oil trough of the individual units and is fed to the unit which is respectively arranged afterwards in the series; and
   feeding the lubricant which is removed from the oil trough of the last unit to the internal combustion engine for combustion,
   wherein the lubricant which is removed from the oil trough of the last unit is fed, or sprayed, for the purposes of combustion, into the exhaust section of the engine.

9. The method as claimed in claim 1, wherein the lubricant which is removed from the last unit is burnt in the engine, at least essentially in proportion to the fuel consumption.

10. The method as claimed in claim 1, wherein the lubricant which is removed from the last unit is burnt in the engine only when there is a full load or partial load of more than 70% of the engine.

11. The method as claimed in claim 1, wherein an essentially constant quantity of lubricant is continuously maintained in the units affected.

12. The method as claimed in claim 1, wherein the lubricant is fed through the series composed of the reservoir container for fresh lubricant, first to last unit to be lubricated, and the fuel line or the exhaust section of the engine, by means of electric, mechanical or hydraulic metering pumps.

13. The method as claimed in claim 1, wherein the corresponding metering pumps are controlled by a control device which receives and evaluates signals of filling level measuring devices, in such a way that the lubricant level in the units is prevented from dropping or being exceeded.

14. A vehicle having an internal combustion engine, having a reservoir container for fresh lubricant, the vehicle comprising:
   at least two units to be lubricated by lubricant successively conveyed through the at least two units, each unit comprising one or more assemblies and having an oil trough, and
   a fuel tank and a fuel line for feeding fuel into the internal combustion engine,
   wherein the at least two units are arranged in series in such a way that a feed line for fresh lubricant leads from the reservoir container to a first unit in a series, in each case a lubricant line leads from a unit which is arranged in a preceding position in the series, to a unit which is arranged afterwards in the series, and a discharge line for used lubricant leads into the fuel line or an exhaust section of the internal combustion engine from the unit which is last in the series,
   wherein the first unit to which lubricant is fed comprises one or more assemblies from the group consisting of hydraulics, transmission, and wet brakes, and
   wherein each consecutive unit comprises at least one assembly being lubricated by the lubricant conveyed from an oil trough of a preceding unit.

15. The vehicle as claimed in claim 14, wherein an additive tank is provided, from which an additive line leads into a lubricant line which leads to at least one unit, or into the oil trough of a unit.

16. The vehicle as claimed in claim 14, wherein at least one of the lubricant lines is equipped with a metering pump.

17. The vehicle as claimed in claim 16, wherein at least one of the units has an automatic fuel level measuring device which is connected, via a control device, to the metering pump.

18. The vehicle as claimed in claim 16, wherein at least one of the units has an oil level sensor which is connected, via a control device, to the metering pump.

19. The vehicle as claimed in claim 16, wherein a central control device is provided which evaluates the measured values of a filling level measuring device and/or of oil state sensors and converts them into a control signal by means of which the metering pump is controlled.

20. The vehicle as claimed in claim 19, wherein the control device is configured in such a way that additional information such as load, engine speed, oil temperatures, current fuel consumption, can be received from the on-board electronics or other vehicle components and is used to control the metering pump.

* * * * *